US009442869B2

(12) United States Patent
Easwaran

(10) Patent No.: US 9,442,869 B2
(45) Date of Patent: Sep. 13, 2016

(54) PROGRAMMABLE INTERRUPT ROUTING IN MULTIPROCESSOR DEVICES

(71) Applicant: Texas Instruments Incorporated, Dallas, TX (US)

(72) Inventor: Vasant Easwaran, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 14/603,609

(22) Filed: Jan. 23, 2015

(65) Prior Publication Data
US 2015/0212955 A1   Jul. 30, 2015

(30) Foreign Application Priority Data

Jan. 24, 2014  (IN) .............................. 313/CHE/2014

(51) Int. Cl.
G06F 13/24 (2006.01)
G06F 13/40 (2006.01)
G06F 13/28 (2006.01)

(52) U.S. Cl.
CPC ............. G06F 13/24 (2013.01); G06F 13/287 (2013.01); G06F 13/4022 (2013.01)

(58) Field of Classification Search
None
See application file for complete search history.

(56) References Cited

U.S. PATENT DOCUMENTS 5,832,279 A * 11/1998 Rostoker ............... G06F 9/4812
                                                        710/266
6,952,749 B2  10/2005 Kim
2005/0021894 A1 *  1/2005 Traynor .................. G06F 13/24
                                                        710/262
2007/0088888 A1 *  4/2007 Orita ....................... G06F 13/24
                                                        710/260

OTHER PUBLICATIONS

R. J. Gountanis and N. L. Viss, "A Method of Processor Selection for Interrupt Handling in a Multiprocessor System", Proceedings of the IEEE, vol. 54, No. 12, Dec. 1966, pp. 1812-1819.
"MultiProcessor Interrupt Controller (MPIC) Core", IBM Systems and Technology Group, MPIC_Core_PB-00, Mar. 2, 2006, pp. 1-3.
Hubert Kirrmann, "Events and Interrupts in Tightly Coupled Multiprocessors", IEEE Micro, vol. 5, Issue 1, Feb. 1985, pp. 53-66.
Wei Chipin et al, "Design of a Configurable Multichannel Interrupt Controller", 2010Second Pacific-Asia Conference on Circuits, Communications and System, Aug. 1-2, 2010, Beijing, China, pp. 327-330.

(Continued)

Primary Examiner — Idriss N Alrobaye
Assistant Examiner — Dayton Lewis-Taylor
(74) Attorney, Agent, or Firm — Ronald O. Neerings; Frank D. Cimino

(57) ABSTRACT

A multiprocessor device is provided that includes a plurality of processors in which each processor of the plurality of processors includes an interrupt controller, and a symmetric interrupt crossbar having a plurality of interrupt inputs in which each interrupt input that is not reserved is coupled to a respective interrupt output of an interrupt source of a plurality of interrupt sources, and a plurality of interrupt outputs in which each interrupt output is coupled to a respective interrupt input of an interrupt controller of one of the plurality of processors, in which the symmetric interrupt crossbar is programmable to map an interrupt signal from any interrupt source of the plurality of interrupt sources coupled to the symmetric interrupt crossbar to any interrupt input of any interrupt controller coupled to the symmetric interrupt crossbar.

10 Claims, 5 Drawing Sheets

(56) References Cited

OTHER PUBLICATIONS

Sebastien Lafond and Johan Lilius, "Interrupt Costs in Embedded System with Short Latency Hardware Accelerators" 15th Annual IEEE International Conference and Workshop on the Engineering of Computer Based Systems, Mar. 31-Apr. 4, 2008, Belfast, Ireland, pp. 317-325.

Chee Yap Sia et al, "Synchronous Design of 8259 Programmable Interrupt Controller", 2011 International Conference on Computer Applications and Industrial Electronics, Dec. 4-7, 2011, Penang, Malaysia, pp. 195-200.

"New TDA3x SoC for ADAS Solutions in Entry- to Mid-level Automobiles", Texas Instruments Incorporated, Technical Brief, SPRT708A, 2014, pp. 1-4.

Antonino Tumeo et al, "An Interrupt Controller for FPGA-based Multiprocessors, 2007 International Conference on Embedded Computer Systems: Architectures, Modeling and Simulation", Jul. 16-19, 2007, Samos, Greece, pp. 82-87.

A. Cantoni, "A Technique for Interrupt Distribution in a Multiprocessor System", Software and Microsystems, vol. 1, No. 6, Oct. 1982, pp. 153-159.

"TI Gives Sight to Vision-Enabled Automotive Technologies", Texas Instruments Incorporated, White Paper, SRY250, Oct. 2013, pp. 1-12.

"ADAS Applications Processor TDA2x System-on-Chip Technical Brief", SPRT680, Texas Instruments Incorporated, Oct. 2013, pp. 1-4.

"TDA2x ADAS System-on-Chip", SPRT681, Texas Instruments Incorporated, 2013, pp. 1-3.

V. Easwaran et al, "Re-configurable Coherent Event Forwarding Mechanism for Multiprocessor Systems", IEEE International Symposium on Signal Processing and Information Technology, Dec. 15-17, 2014, Noida, India, pp. 1-4.

\* cited by examiner

PROGRAMMABLE INTERRUPT ROUTING IN MULTIPROCESSOR DEVICES

CROSS-REFERENCE TO RELATED APPLICATIONS

This application claims benefit of India Provisional Patent Application Serial No. 313/CHE/2014, filed Jan. 24, 2014, which is incorporated herein by reference in its entirety.

BACKGROUND OF THE DISCLOSURE

1. Field of the Disclosure

Embodiments of the present disclosure generally relate to multiprocessor devices, and more specifically relates to programmable interrupt routing in a multiprocessor device.

2. Description of the Related Art

Multiprocessor devices containing tens of processing cores and hundreds of peripherals are now commonly implemented to address the high performance requirements of mobile, multi-media and communications infrastructure, automotive safety, and other application segments. These devices may contain myriad serial and parallel connectivity interfaces, and storage interfaces tailored to suit market requirements. Typical hardware architectures of such devices may include multiple processors of various types, e.g., digital signal processors, image processors, graphics processors, and microprocessors, to meet computational needs along with a rich set of peripherals to meet connectivity requirements. Modules included in such devices may include, for example, DMAs (direct-memory-access) accelerators for graphics, vision and video, infrastructural components for interconnect, power management, registers and debug, a memory subsystem, serial peripheral interfaces, high speed video interfaces for display and capture, and a number of support elements for inter-processor communication, timing synchronization, and virtualization components. The complex interaction between the processing elements and the peripherals poses technical challenges in terms of assigning application specific roles for each component. Interrupts and events are one of the basic building blocks for communication between the peripherals and the processors and are typically statically assigned during design which may prohibit some applications.

SUMMARY

Embodiments of the present disclosure relate to apparatus and methods for programmable interrupt routing in multiprocessor devices. In one aspect, a multiprocessor device is provided that includes a plurality of processors in which each processor of the plurality of processors includes an interrupt controller, and a symmetric interrupt crossbar having a plurality of interrupt inputs in which each interrupt input that is not reserved is coupled to a respective interrupt output of an interrupt source of a plurality of interrupt sources, and a plurality of interrupt outputs in which each interrupt output is coupled to a respective interrupt input of an interrupt controller of one of the plurality of processors, in which the symmetric interrupt crossbar is programmable to map an interrupt signal from any interrupt source of the plurality of interrupt sources coupled to the symmetric interrupt crossbar to any interrupt input of any interrupt controller coupled to the symmetric interrupt crossbar.

In one aspect, a method for interrupt routing in a multiprocessor device is provided that includes receiving an interrupt signal from an interrupt source of a plurality of interrupt sources at a corresponding interrupt input in each multiplexer of a plurality of multiplexers included in the multiprocessor device, in which each multiplexer includes corresponding inputs for each interrupt source of the plurality of interrupt sources and each multiplexer includes a single output coupled to a corresponding input of an interrupt controller of one of a plurality of processors in the multiprocessor device, and outputting the interrupt signal from a multiplexer of the plurality of multiplexers to the corresponding input of the interrupt controller coupled to the output of the multiplexer when a signal select value on a select input of the multiplexer selects the corresponding interrupt input in the multiplexer.

In one aspect, a symmetric interrupt crossbar in a multiprocessor device is provided that includes a plurality of interrupt inputs in which each interrupt input of at least some of the plurality of interrupt inputs are coupled to corresponding interrupt outputs of a plurality of interrupt sources of the multiprocessor device, and a plurality of multiplexers in which each multiplexer includes a same number of inputs as the plurality of interrupt inputs of the symmetric interrupt crossbar and each input of a multiplexer is coupled to a corresponding one interrupt input of the plurality of interrupt inputs, a single output coupled to a corresponding one external interrupt input of a plurality of external interrupt inputs of interrupt controllers of a plurality of processors of the multiprocessor device, and a select input coupled to a corresponding control register of a plurality of programmable control registers included in the multiprocessor device.

BRIEF DESCRIPTION OF THE DRAWINGS

Particular embodiments will now be described, by way of example only, and with reference to the accompanying drawings.

DETAILED DESCRIPTION OF EMBODIMENTS OF THE DISCLOSURE

Figure 1:
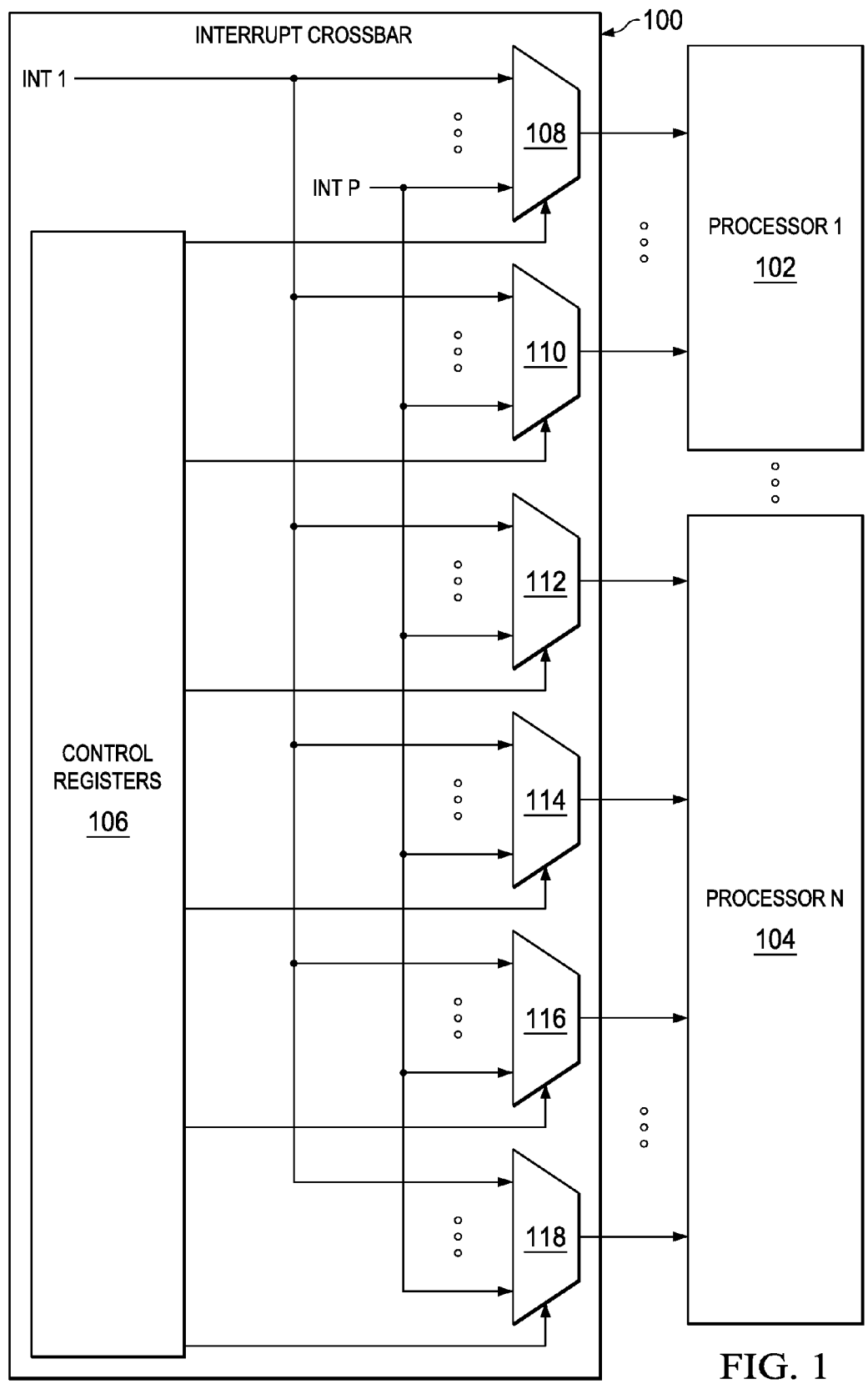
FIG. 1 is a block diagram of an example symmetric interrupt crossbar in a multiprocessor device.

Specific embodiments of the disclosure will now be described in detail with reference to the accompanying figures. Like elements in the various figures are denoted by like reference numerals for consistency.

Integration of multiple processors of differing types into a multiprocessor device intended to support differing application requirements over the lifetime of the device architecture makes the assignment of interrupts challenging for the system architect. Some of the challenges include interfacing to embedded interrupt controllers in the multiple processors and the possible number of interrupts from numerous peripherals exceeding what an embedded interrupt controller is designed to handle.

Embodiments of the disclosure provide programmable interrupt routing in a multiprocessor device via a programmable symmetric interrupt crossbar that allows an interrupt from any interrupt source couple to the crossbar to be mapped to the interrupt controller of any processor in the multiprocessor device coupled to the crossbar. More specifically, a programmable symmetric interrupt crossbar is provided that includes a multiplexer (MUX) for each external interrupt input that is available for accepting interrupts in each interrupt controller of each processor. The MUXs are identical, i.e., each MUX has one input for crossbar input and one output coupled to an input of an interrupt controller in one processor. Each MUX is coupled to a control register that can be programmed to select one of the MUX inputs as the output. Thus, each MUX can be programmed to send an interrupt from any interrupt source coupled to the crossbar to the interrupt controller coupled to the output of the MUX.

FIG. 1 is a block diagram of an example programmable symmetric interrupt crossbar 100 in a multiprocessor device. In this example, the multiprocessor device has P interrupt sources and N processors 102,104 configured to accept external interrupts from the interrupt sources. The N processors may be any combination of processors with internal interrupt controllers configured to accept external interrupts, e.g., a combination of one or more digital signal processors (DSPs), microprocessors (MPUs), image processors, and/or vision processors. In some embodiments, the processors may all be the same. The P interrupt sources may be any combination of interrupt sources internal to the multiprocessor device or external to the multiprocessor device.

The interrupt crossbar 100 includes control registers 106 and one multiplexer (MUX) 108-118 for each external interrupt input of the N processors 102, 104 that is available for accepting external interrupts from the interrupt sources. As one of ordinary skill in the art will understand, in some embodiments, one or more external interrupt inputs of a processor may be reserved for specific interrupt processing and thus not coupled to a MUX 108-118. The interrupt crossbar 108 further includes P inputs, each of which is coupled to one of the P interrupt sources, and P outputs, each of which is coupled to a respective input of each of the MUXs. The MUXs 108-118 are identical and each has P inputs, each of which is coupled to one of the P interrupt sources, i.e., is coupled to an interrupt output of an interrupt source. Each MUX 108-118 has one output which is coupled to an external interrupt input of an interrupt controller on one of the N processors 102, 104. Further, each MUX 108-118 has a select input coupled to a respective control register of the control registers 106. The select input of each MUX 108-118 includes sufficient select lines to select among the P inputs of the MUX. In general, if $2^{n-1}<P\leq2^n$, the select input will have n select lines.

The control registers 106 include sufficient storage to store a signal select value for each MUX 108-118. In general, a signal select value is n bits, i.e., sufficient bits to provide a unique "address" for each of the P inputs of a MUX. In some embodiments, the control registers 106 include a control register for each MUX 108-118 of at least n bits each. In some embodiments, each control register in the control registers 106 includes sufficient bits to store more than one signal select value. In such embodiments, the select inputs for more than one MUX may be coupled to each of the control registers. For example, if n=8, a control register with at least sixteen bits can store two signal select values. Thus, select inputs from a pair of MUXes can be coupled to each control register.

The control registers 106 may be programmed via an interface (not shown) to set the signal select value for each MUX 108-118. For example, a software program stored on the multiprocessor device, e.g., in read-only-memory, may be executed when the device is booted to set the signal select values for each of the MUXs 108-118. This software program programs the control registers as needed for the particular application(s) of the multiprocessor device. In some embodiments, the interrupt configuration programmed into the control registers is static, i.e., the control registers 106 are programmed one time when the device is booted. In some embodiments, some or all of the control registers 106 may have default values for a default interrupt configuration and the software may change one or more of these default values at boot time.

In operation, once the control registers 106 are programmed, interrupt signals from the P interrupt sources are received at corresponding interrupt inputs of the interrupt crossbar 100. A received interrupt signal is routed from the interrupt input to a corresponding input of each MUX 108-118. Based on the input select value stored in the coupled control register, a MUX either ignores the interrupt signal on the input or applies the interrupt signal to the output of the MUX. For example, an interrupt signal on the INT 1 input is routed to an INT 1 input on each MUX. If the signal select value in the control register coupled to the select input of a MUX is set to select the INT 1 input, then the MUX applies the interrupt signal to the output of the MUX, which is coupled to an external interrupt input of one of the N processors 102, 104; otherwise, the interrupt signal is ignored by the MUX.

In some embodiments, an incoming interrupt signal may be routed to more than one processor 102-104. For example, the control register for MUX 108 can be programmed to cause the MUX to send an INT 1 signal to Processor 1 and MUX 114 can be programmed to cause the MUX to send an INT 1 signal to Processor N. Further, in some embodiments, MUXes coupled to interrupt inputs of the same processor can route the same incoming interrupt signal to that processor. For example, the control registers for both MUX 112 and MUX 114 can be programmed to cause the MUXes to send an INT 1 signal to processor N.

The above approach to interrupt routing provides flexibility to route any of the interrupt requests from interrupt sources to any processor configured to accept external interrupts from the interrupt sources. Thus, the multiprocessor device is configurable to serve a broader set of applications than possible with prior art approaches to interrupt routing. Further, the symmetry of the approach enables easier automatic generation of RTL (Register Transistor Level) descriptions and control register configuration software.

Figure 2:
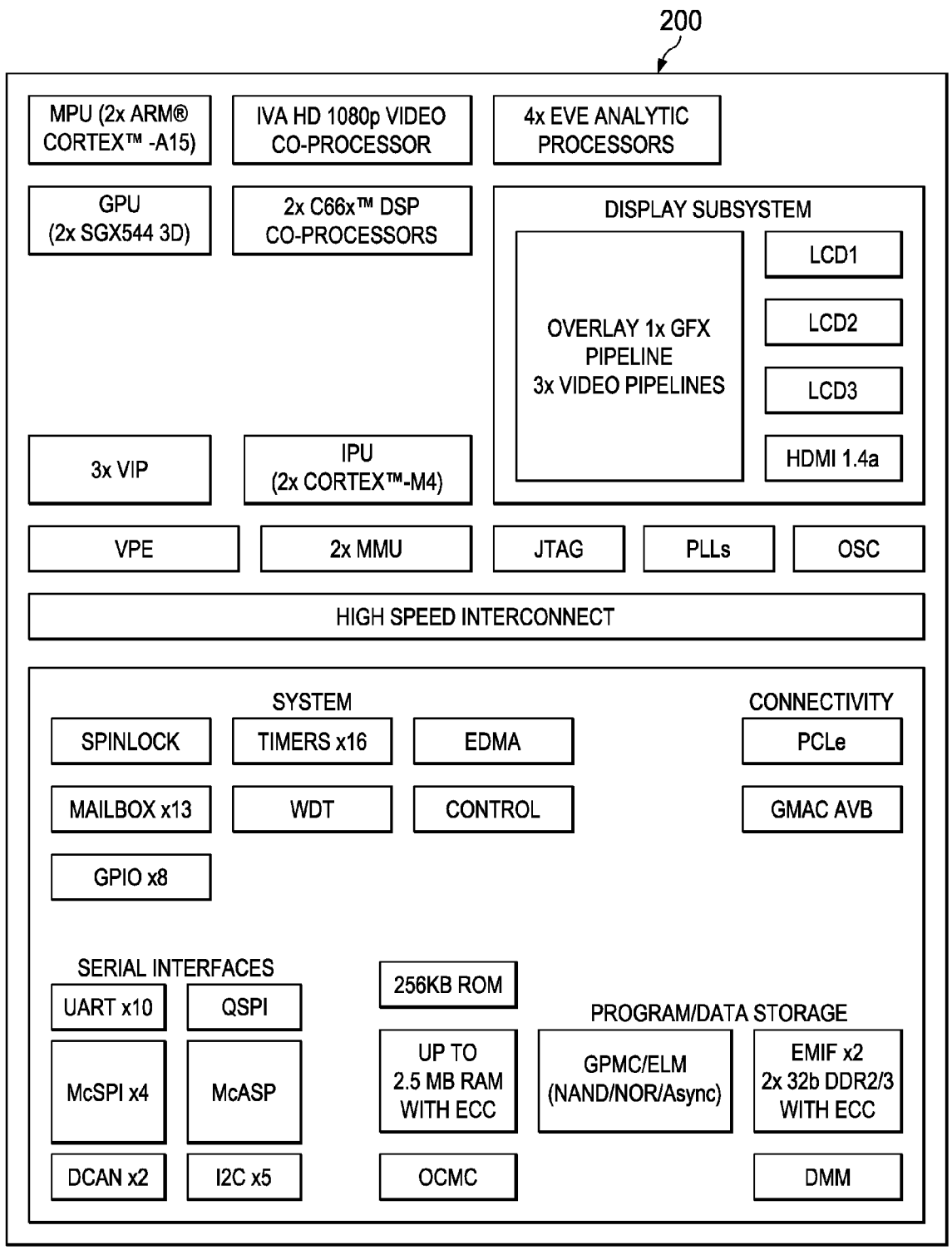
FIG. 2 is a block diagram of an example multiprocessor device including an embodiment of the symmetric interrupt crossbar.

FIG. 2 is a block diagram of an example multiprocessor system-on-a-chip (SOC) 200 including an embodiment of a programmable symmetric interrupt crossbar. The SOC is a high-performance, automotive vision application device available from Texas Instruments. The architecture of the SOC 200 is designed for Advanced Driver Assistance System (ADAS) applications such as vision analytics for single or dual front cameras, surround view, night vision, blind spot detection, etc.

The SOC 200 includes an ARM® Cortex™-A15 microprocessor unit (MPU) subsystem including two ARM® Cortex™-A15 cores, two Texas Instruments digital signal processor (DSP) C66x™ subsystems, an ARM® Cortex™-M4 image processing unit (IPU) subsystem including two ARM® Cortex™-M4 microprocessors, and four embedded vision engine (EVE) subsystems. An EVE is a programmable imaging and vision processing engine that allows late in-development or post-silicon processing requirements to be met by addition of differentiating features in imaging and vision products. Each EVE includes a scalar core and a vector core for specialized vision processing. As is depicted in more detail in FIG. 5, each of these processing subsystems is coupled to a programmable symmetric interrupt crossbar (not shown) to receive external interrupts from various interrupt sources of the SOC 200.

The SOC 200 further includes an image and video accelerator high-definition (IVA-HD) subsystem, a display subsystem, a video processing subsystem (VPE), three video input port (VIP) modules providing video capture functions, a 3D-graphics processing unit (GPU) subsystem including a POWERVR™ SGX544 dual-core processor, and a multi-processor debug subsystem (not shown). The IVA-HD subsystem is a set of video encoder and decoder hardware accelerators for real-time video encoding and decoding of various video formats.

The display subsystem provides the control signals required to interface frame buffers stored in SOC 200 memory directly to one or more displays. The display subsystem includes a display controller with three video pipelines, a graphic (GFX) pipeline, and three liquid crystal display (LCD) outputs. The display subsystem further includes a high-definition multimedia interface (HDMI) encoder. The VPE module provides support for various operations on video streams such as de-interlacing, scaling, chroma up- and downsampling, and color space conversion. The GPU subsystem provides support for photo-realistic high-performance 3D graphics. The GPU subsystem can simultaneously process different data types such as pixel data, vertex data, video data, and general purpose data.

The SOC 200 also includes three instantiations of an on-chip memory controller (OOMC) with associated random access memory (RAM) or read-only memory (ROM). Memory management for the SOC 200 is performed form an enhanced direct memory access (EDMA) controller, a dynamic memory management (DMM) which performs global address translation, address rotation (tiling), and access interleaving between two external memory interface (EMIF) channels, and two memory management units (MMU), one dedicated to the EDMA controller and one dedicated to the peripheral component interconnect (PCI) Express (PCIe) subsystem.

The SOC 200 supports a rich set of peripherals including system peripherals, car connectivity peripherals, audio connectivity peripherals, and serial control peripherals. The system peripherals include sixteen general-purpose timers, a watchdog timer (WDT), a synchronization timer, a system control module (Control) with registers for, for example, static device configuration, pad configuration, and I/O configuration, thirteen system mailboxes for communication between the MPU, DSP, and IPU subsystems, a spinlock modules for hardware semaphores between the MPU, DSP, and IPU subsystems, and eight general-purpose input/output (GPIO) modules. The car connectivity peripherals include a gigabit media access controller (GMAC) providing an external Ethernet port, two controllers (DCAN) compliant to the Controller Area Network (CAN) protocol, and one PCIe subsystem with an external port.

The audio connectivity peripherals include a multichannel audio serial port (MCASP) supporting up to sixteen channels. The serial control peripherals include ten universal asynchronous receiver/transmitter (UART) modules, four general-purpose multichannel serial peripheral interface (MCSPI) modules, and five multi-master high speed inter-IC (I2C) controller modules.

Figure 3:
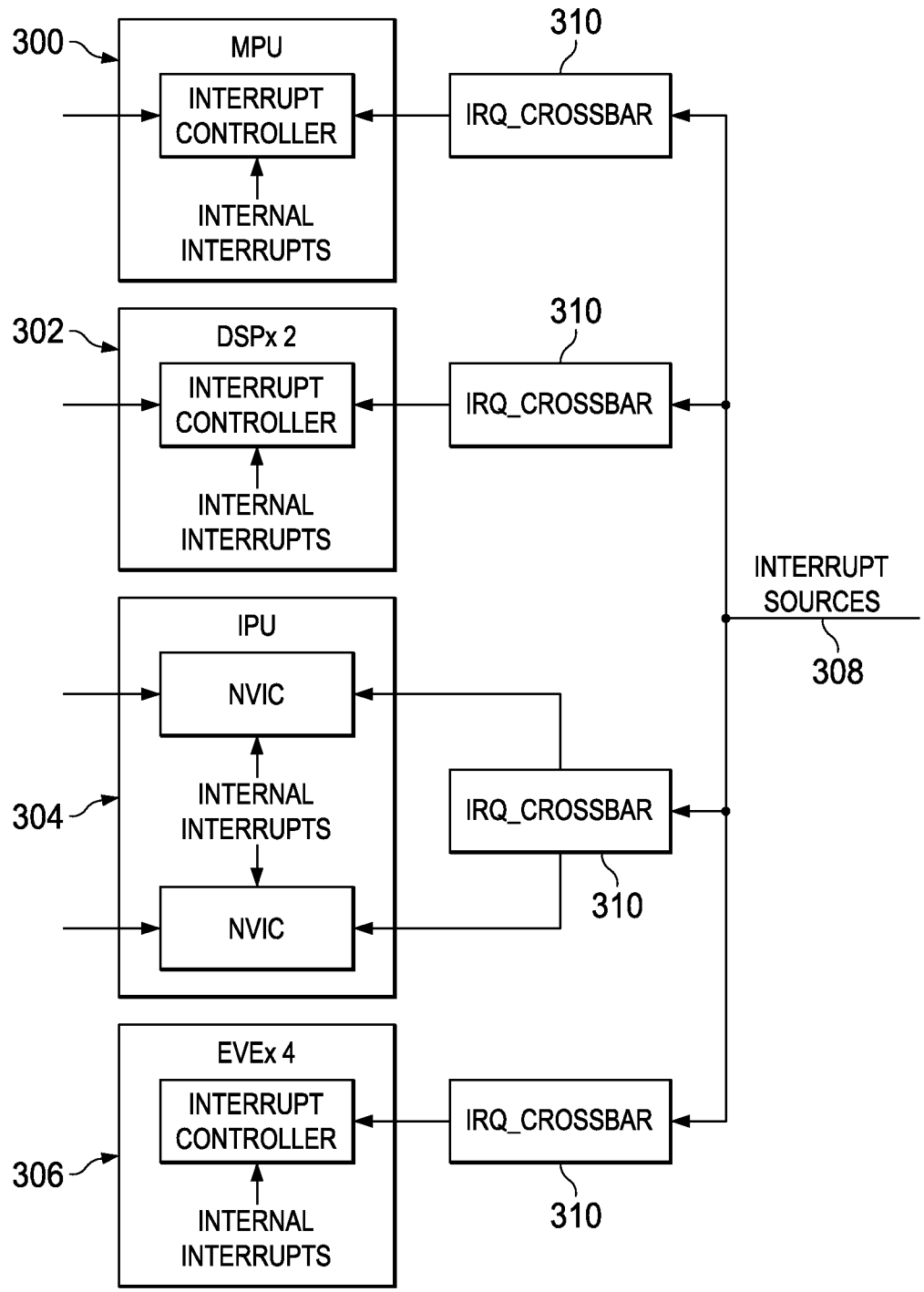
FIG. 3 is a block diagram illustrating the symmetric interrupt crossbar connectivity of the multiprocessor device of FIG. 2.

FIG. 3 is a block diagram illustrating the symmetric interrupt crossbar 310 connectivity of the SOC 200 of FIG. 2. As shown in FIG. 3, interrupt sources 308 of the SOC 200 are coupled to inputs of the interrupt crossbar 310. The interrupt sources may be any combination of interrupt sources internal to the SOC 200 or external to the SOC 200. Some example interrupt sources include a timer interrupt to indicate when a set time has elapsed or at regular intervals, a GPIO interrupt to indicate when a toggle occurred on the external pin, and a McASP interrupt to indicate data transfer completion on the input and output of the serial port.

More specifically, interrupt outputs of the interrupt sources 308 are each coupled to a respective interrupt input of the interrupt crossbar 310. The outputs of the interrupt crossbar 310 are coupled to respective external interrupt inputs of interrupt controllers on the processors 300-306 of the SOC 200. As previously mentioned in reference to FIG. 2, the processors include an MPU 300, two DSPs 302 (each having an interrupt controller), an IPU 304 with two nested vector interrupt controllers (NVIC), and four EVEs 306 (each having an interrupt controller).

There is an output in the interrupt crossbar 310 for each external interrupt input of the interrupt controllers in the processors 300-306 that is to be used for accepting interrupts from one or more of the interrupt sources 308. For example, if the interrupt controller of the MPU 300 has ten such external interrupt inputs, the interrupt crossbar 308 will have ten outputs for the MPU 300, each coupled to a respective external interrupt input. In another example, if the four interrupt controllers of the EVEs 306 each have five such external interrupt inputs, the interrupt crossbar 310 will have twenty interrupt outputs for the EVEs 306, each coupled to a respective external input.

Figure 4:
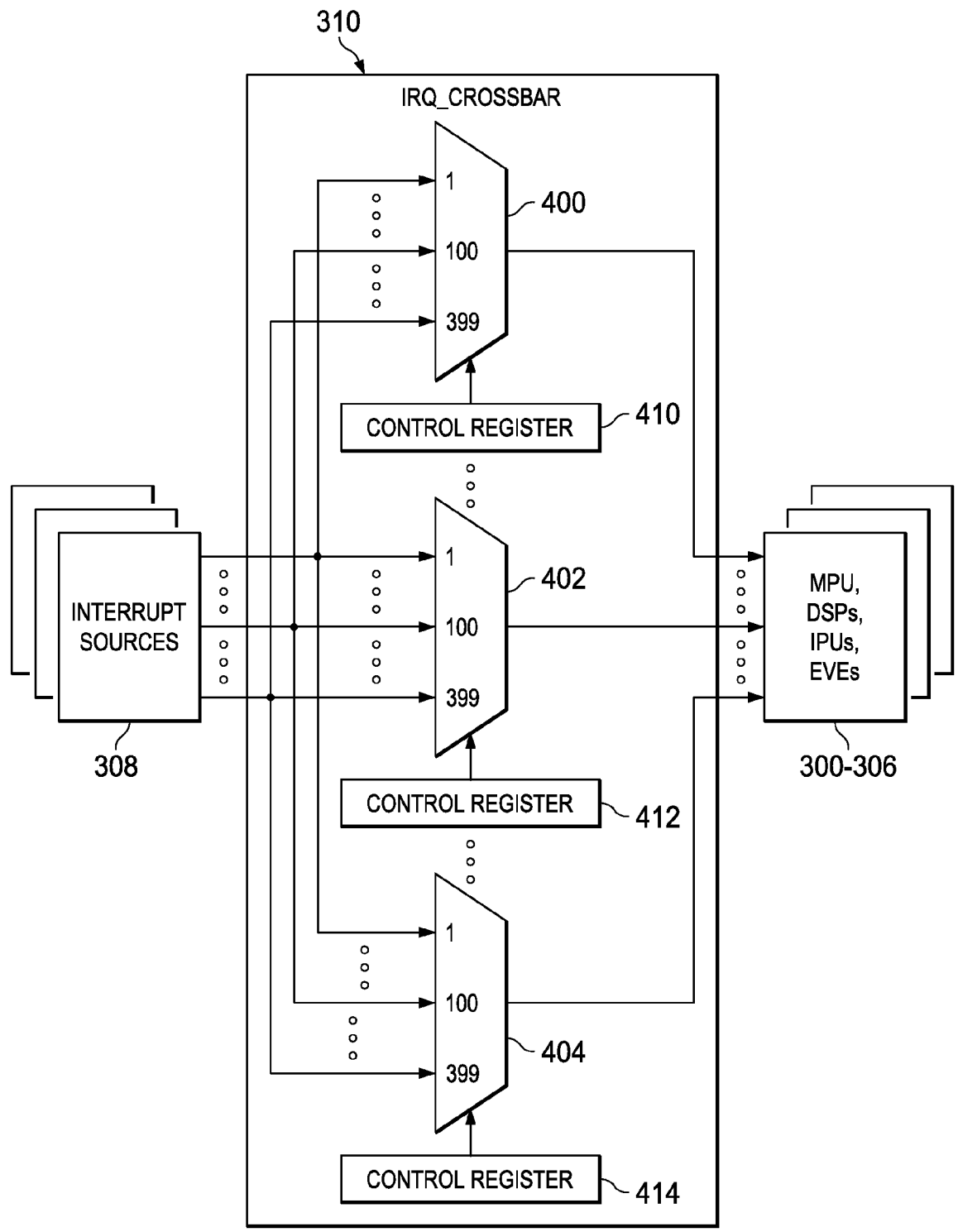
FIG. 4 is a block diagram of the symmetric interrupt crossbar of FIG. 3.

FIG. 4 is a block diagram of the symmetric interrupt crossbar 310 of FIG. 3. As shown in FIG. 4, the interrupt crossbar 310 includes 399 inputs for interrupts from the interrupt sources 308. In some embodiments, each of the 399 inputs is coupled to respective interrupt outputs of the interrupt sources 308. In some embodiments, one or more of the interrupt inputs is reserved, i.e., is not coupled to an interrupt source. In some embodiments, the interrupt crossbar 310 may include additional inputs that are not coupled to an interrupt source. These additional inputs are reserved for future use. Further, in some embodiments, there may be an interrupt input 0 in the crossbar 310. Which interrupt inputs in the crossbar 310 are coupled to which interrupt outputs is decided at design time.

The interrupt crossbar includes identical multiplexers 400-404, one for each external interrupt input of the interrupt controllers of the processors 300-306 of the SOC 400 that is to be used for accepting interrupts from one or more of the interrupt sources 308. For example, if the processors 300-306 have 300 such external interrupt inputs collectively, the interrupt crossbar 310 includes 300 multiplexers. Further, each multiplexer 400-404 has one input for each input of the interrupt crossbar 310. As shown in the embodiment of FIG. 4, each multiplexer 400-404 has 399 inputs, and each of these inputs is coupled to a respective input of the interrupt crossbar 310 such that each multiplexer can receive all 399 of the interrupt signals from the interrupt sources 308. In embodiments in which one or more of the interrupt inputs to the crossbar 301 are reserved, each multiplexer 400-404 will include inputs for the reserved crossbar inputs as well. Further, in embodiments in which there is an interrupt input 0 in the crossbar 310, each multiplexer 400-704 includes an input for interrupt input 0. Each multiplexer 400-404 has one output and the outputs of the multiplexers are coupled to respective external interrupt inputs of the interrupt controllers of the processors 300-306 of the SOC 200. Which multiplexer output is coupled to which external interrupt input is decided at design time.

Each multiplexer 400-404 includes a select input coupled to a control register 410-414. The select input of each multiplexer 400-404 includes sufficient select lines to select among the 399 inputs of the multiplexer. In embodiments in which additional inputs are present but not used, the select input of each multiplexer 400-404 includes sufficient select lines to select among all the inputs.

The control registers 410-414 are registers in the system control module of the SOC 400. Each control register 410-414 includes sufficient storage to store a signal select value for two multiplexers 400-412. To select among the 399 signals of the depicted embodiment, nine bits are needed. Thus, each control register 410-414 includes eighteen bits, nine of which are used to indicate the signal select value for one multiplexer coupled to the control register and the other nine of which are used to indicate the signal select value for another multiplexer coupled to the control register. Note that nine bits are sufficient to store a signal select value for 512 inputs to a multiplexer.

The control registers 410-414 may be programmed via an interface (not shown) to set the signal select value for each multiplexer 400-404. For example, a software program stored in the ROM of the SOC 400 may be executed when the SOC 400 is booted to set the signal select values in the control registers 410-414 coupled to the multiplexers 400-404.

In operation, once the control registers 410-414 are programmed, interrupts from the interrupt sources 308 are received at corresponding interrupt inputs of the interrupt crossbar 310. A received interrupt is routed from the interrupt input to a corresponding input of each multiplexer 400-404. Based on the input select value stored in the respective coupled control registers 410-414, a multiplexer either ignores the interrupt signal on the input or applies the interrupt signal to the output of the multiplexer.

Figure 5:
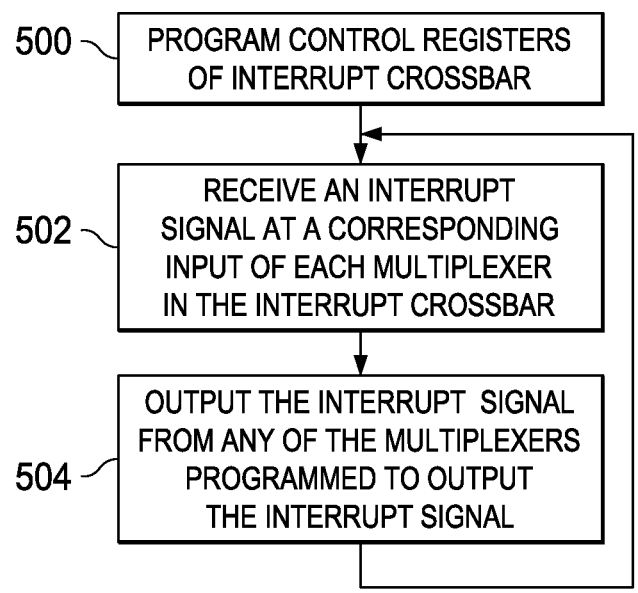
FIG. 5 is a flow diagram of a method for interrupt routing in a multiprocessor device.

FIG. 5 is a flow diagram of a method for interrupt routing in a multiprocessor device having a programmable symmetric interrupt crossbar. Initially, the control registers of the interrupt crossbar are programmed 500 with signal select values for the multiplexers in the interrupt crossbar. This programming may occur via a software program executed when the multiprocessor device is booted. In some embodiments, one or more of the control registers may have default signal select values and the software program may change these default values. As previously mentioned, a signal select value for a multiplexer controls which one of the input interrupt signals to the multiplexer will be passed to the output of the multiplexer, and hence to an external interrupt input coupled to the multiplexer output.

Once the control registers are programmed, the device is ready to receive interrupts from interrupt sources coupled to the inputs of the symmetric interrupt crossbar. When an interrupt signal from an interrupt source is received 502 at an input of the symmetric interrupt crossbar, the interrupt signal is passed to a corresponding input of each multiplexer in the interrupt crossbar. The interrupt signal is output 504 by any of the multiplexers having a signal select value on the select input corresponding to the input receiving the interrupt signal. For example, if the interrupt signal is on input 100 of a multiplexer and the value on the select input of the multiplexer indicates that the multiplexer is to output the interrupt signal on input 100, the multiplexer will output the signal; otherwise, the multiplexer will not output the signal.

The interrupt signal is output by each of the multiplexers having the appropriate signal select value to an external interrupt input of an interrupt controller of a processor in the multiprocessor device that is coupled to the output of the multiplexer.

Other Embodiments

While the disclosure has been described with respect to a limited number of embodiments, those skilled in the art, having benefit of this disclosure, will appreciate that other embodiments can be devised which do not depart from the scope of the disclosure as disclosed herein.

For example, while embodiments have been described herein in which one or more signal select values of a symmetric interrupt crossbar are programmed when a multiprocessor device is booted, one of ordinary skill in the art will understand embodiments in which default signal select values are stored in the control registers and are not changed by a software program when the device is booted.

Although method steps may be presented and described herein in a sequential fashion, one or more of the steps shown in the figures and described herein may be performed concurrently, may be combined, and/or may be performed in a different order than the order shown in the figures and/or described herein. Accordingly, embodiments should not be considered limited to the specific ordering of steps shown in the figures and/or described herein.

Certain terms are used throughout the description and the claims to refer to particular system components. As one skilled in the art will appreciate, components in radar systems may be referred to by different names and/or may be combined in ways not shown herein without departing from the described functionality. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection, for example.

It is therefore contemplated that the appended claims will cover any such modifications of the embodiments as fall within the true scope of the disclosure.

What is claimed is:

1. A multiprocessor device comprising:
   a plurality of processors wherein each processor of the plurality of processors includes an interrupt controller having one or more interrupt inputs; and
   a symmetric interrupt crossbar coupled to the one or more interrupt inputs of the interrupt controllers, the symmetric interrupt crossbar having a plurality of interrupt inputs and a plurality of interrupt outputs, wherein each interrupt input that is not reserved is coupled to a respective interrupt output of an interrupt source of a plurality of interrupt sources, and the plurality of interrupt outputs is coupled to the one or more interrupt inputs of the interrupt controllers in a one-to-one relationship such that one interrupt output is coupled to only one interrupt input of only one interrupt controller, wherein the symmetric interrupt crossbar is programmable to map an interrupt signal from any interrupt source of the plurality of interrupt sources coupled to the symmetric interrupt crossbar to any interrupt input of any interrupt controller coupled to the symmetric interrupt crossbar, wherein programming the symmetric interrupt crossbar to map interrupt signals from the plurality of input sources to interrupt inputs of the interrupt controllers is performed when the multiprocessor device is booted.

2. The multiprocessor device of claim 1, wherein the symmetric interrupt crossbar includes one multiplexer for each interrupt input of each interrupt controller coupled to the symmetric interrupt crossbar, wherein each multiplexer includes an interrupt output coupled to a respective interrupt input of an interrupt controller, a plurality of interrupt inputs in which each interrupt input is coupled to a respective interrupt input of the symmetric interrupt crossbar, and a select input coupled to a respective control register of a plurality of programmable control registers to receive a signal select value indicating which of the plurality of interrupt inputs of the multiplexer is to be applied to the interrupt output of the multiplexer.

3. The multiprocessor device of claim 2, wherein at least one control register stores a default signal select value for a multiplexer coupled to the at least one control register.

4. The multiprocessor device of claim 1, wherein the processors of the plurality of processors are not all a same type of processor.

5. A method for interrupt routing in a multiprocessor device wherein each processor of a plurality of processors of the multiprocessor device includes an interrupt controller having one or more interrupt inputs, the method comprising:
receiving an interrupt signal from an interrupt source of a plurality of interrupt sources at a respective interrupt input in each multiplexer of a plurality of multiplexers included in the multiprocessor device, wherein each multiplexer includes respective inputs for each interrupt source of the plurality of interrupt sources and each multiplexer includes a single interrupt output, wherein the interrupt outputs are coupled to the one or more interrupt inputs of the interrupt controllers in a one-to-one relationship such that one interrupt output is coupled to only one interrupt input of only one interrupt controller; and
outputting the interrupt signal from a multiplexer of the plurality of multiplexers to the interrupt input of the interrupt controller coupled to the interrupt output of the multiplexer when a signal select value on a select input of the multiplexer selects the respective interrupt input in the multiplexer.

6. The method of claim 5, further comprising programming at least some signal select values for at least some multiplexers of the plurality of multiplexers in control registers included in the multiprocessor device when the multiprocessor device is booted, the control registers coupled to corresponding select inputs of the multiplexers.

7. The method of claim 6, wherein at least one control register stores a default signal select value for a multiplexer of the plurality of multiplexers coupled to the at least one control register.

8. A symmetric interrupt crossbar in a multiprocessor device, the multiprocessor device comprising a plurality of processors each including an interrupt controller having one or more interrupt inputs, the symmetric interrupt crossbar comprising:
a plurality of interrupt inputs in which each interrupt input of at least some of the plurality of interrupt inputs are coupled to respective interrupt outputs of a plurality of interrupt sources of the multiprocessor device; and
a plurality of multiplexers in which each multiplexer includes a same number of inputs as the plurality of interrupt inputs of the symmetric interrupt crossbar and each input of a multiplexer is coupled to a respective one interrupt input of the plurality of interrupt inputs, a single interrupt output, and a select input coupled to a respective control register of a plurality of programmable control registers included in the multiprocessor device, wherein the interrupt outputs of the plurality of multiplexers are coupled to the one or more interrupt inputs of the interrupt controllers in a one-to-one relationship such that one interrupt output is coupled to only one interrupt input of only one interrupt controller.

9. The symmetric interrupt crossbar of claim 8, wherein the plurality of programmable control registers is programmed when the multiprocessor device is booted.

10. The symmetric interrupt crossbar of claim 9, wherein at least one control register of the plurality of programmable control registers stores a default signal select value for a multiplexer coupled to the at least one control register.

* * * * *